(12) United States Patent
Jain et al.

(10) Patent No.: US 11,995,479 B2
(45) Date of Patent: May 28, 2024

(54) IMPLEMENTING WORKLOADS IN A MULTI-CLOUD ENVIRONMENT WITH DATA MIGRATION BETWEEN CLOUD VENDORS

(71) Applicant: International Business Machines Corporation, Armonk, NY (US)

(72) Inventors: Abhishek Jain, Baraut (IN); Sasikanth Eda, Vijayawada (IN); Dileep Dixith, Hyderabad (IN); Sandeep Ramesh Patil, Pune (IN); Anbazhagan Mani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 16/732,690

(22) Filed: Jan. 2, 2020

(65) Prior Publication Data
US 2021/0208952 A1    Jul. 8, 2021

(51) Int. Cl.
*G06F 9/46* (2006.01)
*G06F 9/50* (2006.01)
*G06F 9/54* (2006.01)
*G06Q 30/0283* (2023.01)
*H04L 9/40* (2022.01)

(52) U.S. Cl.
CPC .......... *G06F 9/5083* (2013.01); *G06F 9/547* (2013.01); *G06Q 30/0283* (2013.01); *H04L 63/1433* (2013.01)

(58) Field of Classification Search
CPC ... G06F 9/5083; G06F 9/547; G06Q 30/0283; H04L 63/1433

USPC ....................................................... 718/105
See application file for complete search history.

(56) References Cited

U.S. PATENT DOCUMENTS

| | | | | |
|---|---|---|---|---|
| 8,272,061 | B1* | 9/2012 | Lotem | H04L 63/1433 726/25 |
| 9,160,681 | B2* | 10/2015 | Seth | G06F 9/5072 |
| 9,454,406 | B2* | 9/2016 | Sabin | H04L 67/1008 |
| 9,998,470 | B1* | 6/2018 | Hockings | H04L 67/306 |

(Continued)

FOREIGN PATENT DOCUMENTS

| CN | 103685540 A | 3/2014 |
|---|---|---|
| CN | 109040193 A | 12/2018 |

(Continued)

OTHER PUBLICATIONS

English translation of CN103685540A (Year: 2014).*
(Continued)

*Primary Examiner* — Bradley A Teets
(74) *Attorney, Agent, or Firm* — Zilka-Kotab, P.C.

(57) ABSTRACT

A computer-implemented method according to one aspect includes determining and storing characteristics of a plurality of cloud vendors; dividing a workload into a plurality of logical stages; determining characteristics of each of the plurality of logical stages; and for each of the plurality of logical stages, assigning the logical stage to one of the plurality of cloud vendors, based on a comparison of the characteristics of the plurality of cloud vendors to the characteristics of the logical stage. Data migration between the cloud vendors is performed during an implementation of the workload to ensure data is located at necessary cloud vendors during the corresponding tasks of the workload.

24 Claims, 9 Drawing Sheets

(56) References Cited

U.S. PATENT DOCUMENTS

| | | | | |
|---|---|---|---|---|
| 10,447,806 | B1* | 10/2019 | Sahay | H04L 67/10 |
| 2013/0155456 | A1* | 6/2013 | Morrison | G06F 3/1288 |
| | | | | 358/1.15 |
| 2014/0280441 | A1* | 9/2014 | Jacobson | H04L 67/10 |
| | | | | 709/201 |
| 2016/0036905 | A1* | 2/2016 | Syed | G06F 9/5077 |
| | | | | 709/226 |
| 2016/0065664 | A1 | 3/2016 | Tung et al. | |
| 2017/0078164 | A1* | 3/2017 | Hildebrand | G06F 11/3447 |
| 2018/0077084 | A1 | 3/2018 | Johnston et al. | |
| 2018/0302335 | A1 | 10/2018 | Gao et al. | |
| 2019/0116237 | A1 | 4/2019 | Gibson | |
| 2020/0278935 | A1* | 9/2020 | Borikar | G06F 12/1027 |
| 2021/0208952 | A1 | 7/2021 | Jain et al. | |

FOREIGN PATENT DOCUMENTS

| | | |
|---|---|---|
| CN | 109783189 A | 5/2019 |
| CN | 110308967 A | 10/2019 |
| CN | 110502323 A | 11/2019 |
| WO | 2019116083 A1 | 6/2019 |
| WO | 2021137046 A1 | 7/2021 |

OTHER PUBLICATIONS

"Live Migration", Wikipedia, Dec. 22, 2018 (Year: 2018).*

English Translation of Korean Office Action 2022-7018178 (Year: 2024).*

IBM, "What is multicloud management?" IBM, accessed on Dec. 4, 2019, 7 pages, retrieved from https://www.bm.com/cloud/multicloud-manager/what-is.

IBM, "Introduction to Platform LSF," IBM Knowledge Center, accessed on Dec. 4, 2019, 4 pages, retrieved from https://www.ibm.com/support/knowledgecenter/en/SSETD4_9.1.3/lsf_foundations/lsf_introduction_to.html.

Wikipedia, "Cyber resilience," Wikipedia, updated on Nov. 8, 2019, 3 pages, retrieved https://en.wikipedia.org/wiki/Cyber_resilience.

Rouse, M., "Composable infrastructure," TechTarget, Feb. 2016, 6 pages, retrieved from https://searchitoperations.techtarget.com/definition/composable-infrastructure.

Anonymous, "Nist Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

International Search Report and Written Opinion from PCT Application No. PCT/IB2020/061315, dated Mar. 9, 2021.

Examination Report from Australian Application No. 2020418595, dated Mar. 9, 2023.

Notice of Acceptance for Australian Patent Application No. 2020418595, dated Jan. 15, 2024, 3 pages.

Office Action from Korean Application No. 2022-7018178, dated Mar. 28, 2024, 16 pages.

* cited by examiner

IMPLEMENTING WORKLOADS IN A MULTI-CLOUD ENVIRONMENT WITH DATA MIGRATION BETWEEN CLOUD VENDORS

BACKGROUND

The present invention relates to workload implementation, and more particularly, this invention relates to distributing workload operations to cloud vendors.

Cloud vendors are often used to provide resources such as computing, storage, and bandwidth to workloads. During the implementation of these workloads, maintaining cyber resilience becomes an important concern. For example, workload data may need to be secured during implementation of the workload, and a predetermined level of service may need to be provided during implementation of the workload. Likewise, workloads may need to be completed in spite of system failures, malware, etc.

However, current workload implementations do not optimize different portions of workloads in view of available cloud vendors in order to optimize and secure implementation of the workload.

BRIEF SUMMARY

A computer-implemented method according to one aspect includes determining and storing characteristics of a plurality of cloud vendors; dividing a workload into a plurality of logical stages; determining characteristics of each of the plurality of logical stages; and for each of the plurality of logical stages, assigning the logical stage to one of the plurality of cloud vendors, based on a comparison of the characteristics of the plurality of cloud vendors to the characteristics of the logical stage.

According to another aspect, the characteristics of each of the plurality of cloud vendors are determined by analyzing the cloud vendor, the analyzing including running capability and cost application programming interfaces (APIs) to perform a scan of the cloud vendor.

In this way, an implementation of each logical stage within the workload may be sent to an optimal cloud vendor for implementation. This may reduce an amount of resources (e.g., computing resources, storage resources, security resources, etc.) required to perform each logical stage, which may improve a performance of one or more computing systems implementing (e.g., executing, etc.) the workload.

According to another aspect, a computer program product for implementing workloads in a multi-cloud environment includes a computer readable storage medium having program instructions embodied therewith, where the computer readable storage medium is not a transitory signal per se, and where the program instructions are executable by a processor to cause the processor to perform a method including determining and storing, by the processor, characteristics of a plurality of cloud vendors; dividing, by the processor, a workload into a plurality of logical stages; determining, by the processor, characteristics of each of the plurality of logical stages; and for each of the plurality of logical stages, assigning, by the processor, the logical stage to one of the plurality of cloud vendors, based on a comparison of the characteristics of the plurality of cloud vendors to the characteristics of the logical stage.

According to one aspect, the characteristics of each of the plurality of cloud vendors are determined by analyzing the cloud vendor, the analyzing including estimating one or more viability factors for each of the cloud vendors, based on collected review information for the cloud vendors, where the viability factors are selected from a group including serviceability, a net promoter score (NPS), user reviews, performance benchmarks, and tuning flexibility.

According to another aspect, a system includes a processor; and logic integrated with the processor, executable by the processor, or integrated with and executable by the processor, where the logic is configured to determine and store characteristics of a plurality of cloud vendors; divide a workload into a plurality of logical stages; determine characteristics of each of the plurality of logical stages; and for each of the plurality of logical stages, assign the logical stage to one of the plurality of cloud vendors, based on a comparison of the characteristics of the plurality of cloud vendors to the characteristics of the logical stage.

According to another aspect, dividing the workload includes parsing the workload to identify points of data input and output within the workload, as well as dependencies associated with input to the workload.

In this way, a cyber resiliency of each logical stage may be ensured, which may reduce an amount of data/computational work that is lost to system outage or malware, which may also improve a performance of the computing systems implementing the workload.

According to another aspect, a computer-implemented method includes determining characteristics of a plurality of cloud vendors by analyzing the plurality of cloud vendors, the analyzing including running capability and cost application programming interfaces (APIs) to perform a scan of the plurality of cloud vendors, collecting and parsing one or more public and private security database information to identify one or more of reports, trends, vulnerabilities, security problems, etc. for each of the plurality of cloud vendors, and parsing one or more fix databases to determine any existing solutions to any existing security problems for one or more of the plurality of cloud vendors; dividing a workload into a plurality of logical stages; determining characteristics of each of the plurality of logical stages; and for each of the plurality of logical stages, assigning the logical stage to one of the plurality of cloud vendors, based on a comparison of the characteristics of the plurality of cloud vendors to the characteristics of the logical stage.

According to another aspect, a computer-implemented method includes determining and storing characteristics of a plurality of cloud vendors; dividing a workload into a plurality of logical stages, including parsing the workload to identify points of data input and output within the workload, as well as dependencies associated with input to the workload, and scanning source code of the workload to predict instances of data input and output within the workload, wherein each of the logical stages includes data input that is not dependent on other logical stages within the workload; determining characteristics of each of the plurality of logical stages; and for each of the plurality of logical stages, assigning the logical stage to one of the plurality of cloud vendors, based on a comparison of the characteristics of the plurality of cloud vendors to the characteristics of the logical stage.

Other aspects and embodiments of the present invention will become apparent from the following detailed description, which, when taken in conjunction with the drawings, illustrate by way of example the principles of the invention.

DETAILED DESCRIPTION

Figure 1:
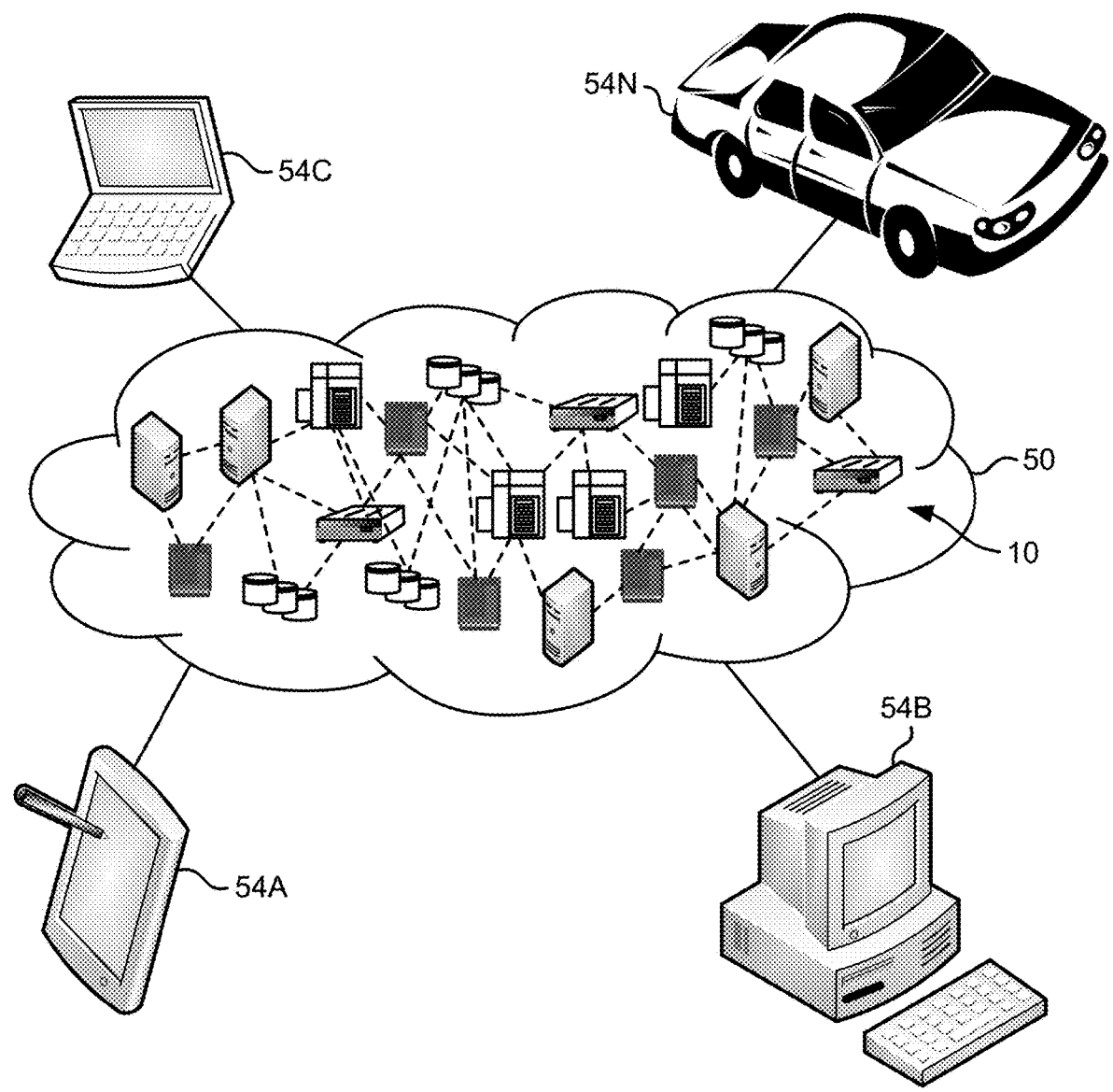
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of implementing workloads in a multi-cloud environment.

In one general aspect, a computer-implemented method includes determining and storing characteristics of a plurality of cloud vendors; dividing a workload into a plurality of logical stages; determining characteristics of each of the plurality of logical stages; and for each of the plurality of logical stages, assigning the logical stage to one of the plurality of cloud vendors, based on a comparison of the characteristics of the plurality of cloud vendors to the characteristics of the logical stage.

In another general aspect, the characteristics of each of the plurality of cloud vendors are determined by analyzing the cloud vendor, the analyzing including running capability and cost application programming interfaces (APIs) to perform a scan of the cloud vendor.

In this way, an implementation of each logical stage within the workload may be sent to an optimal cloud vendor for implementation. This may reduce an amount of resources (e.g., computing resources, storage resources, security resources, etc.) required to perform each logical stage, which may improve a performance of one or more computing systems implementing (e.g., executing, etc.) the workload.

In another general aspect, a computer program product for implementing workloads in a multi-cloud environment includes a computer readable storage medium having program instructions embodied therewith, where the computer readable storage medium is not a transitory signal per se, and where the program instructions are executable by a processor to cause the processor to perform a method including determining and storing, by the processor, characteristics of a plurality of cloud vendors; dividing, by the processor, a workload into a plurality of logical stages; determining, by the processor, characteristics of each of the plurality of logical stages; and for each of the plurality of logical stages, assigning, by the processor, the logical stage to one of the plurality of cloud vendors, based on a comparison of the characteristics of the plurality of cloud vendors to the characteristics of the logical stage.

In another general aspect, the characteristics of each of the plurality of cloud vendors are determined by analyzing the cloud vendor, the analyzing including estimating one or more viability factors for each of the cloud vendors, based on collected review information for the cloud vendors, where the viability factors are selected from a group including serviceability, a net promoter score (NPS), user reviews, performance benchmarks, and tuning flexibility.

In another general aspect, a system includes a processor; and logic integrated with the processor, executable by the processor, or integrated with and executable by the processor, where the logic is configured to determine and store characteristics of a plurality of cloud vendors; divide a workload into a plurality of logical stages; determine characteristics of each of the plurality of logical stages; and for each of the plurality of logical stages, assign the logical stage to one of the plurality of cloud vendors, based on a comparison of the characteristics of the plurality of cloud vendors to the characteristics of the logical stage.

In another general aspect, dividing the workload includes parsing the workload to identify points of data input and output within the workload, as well as dependencies associated with input to the workload.

In this way, a cyber resiliency of each logical stage may be ensured, which may reduce an amount of data/computational work that is lost to system outage or malware, which may also improve a performance of the computing systems implementing the workload.

In another general aspect, a computer-implemented method includes determining characteristics of a plurality of cloud vendors by analyzing the plurality of cloud vendors, the analyzing including running capability and cost application programming interfaces (APIs) to perform a scan of the plurality of cloud vendors, collecting and parsing one or more public and private security database information to identify one or more of reports, trends, vulnerabilities, security problems, etc. for each of the plurality of cloud vendors, and parsing one or more fix databases to determine any existing solutions to any existing security problems for one or more of the plurality of cloud vendors; dividing a workload into a plurality of logical stages; determining characteristics of each of the plurality of logical stages; and for each of the plurality of logical stages, assigning the logical stage to one of the plurality of cloud vendors, based on a comparison of the characteristics of the plurality of cloud vendors to the characteristics of the logical stage.

In another general aspect, a computer-implemented method includes determining and storing characteristics of a plurality of cloud vendors; dividing a workload into a plurality of logical stages, including parsing the workload to identify points of data input and output within the workload, as well as dependencies associated with input to the workload, and scanning source code of the workload to predict instances of data input and output within the workload, wherein each of the logical stages includes data input that is not dependent on other logical stages within the workload; determining characteristics of each of the plurality of logical stages; and for each of the plurality of logical stages, assigning the logical stage to one of the plurality of cloud vendors, based on a comparison of the characteristics of the plurality of cloud vendors to the characteristics of the logical stage.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
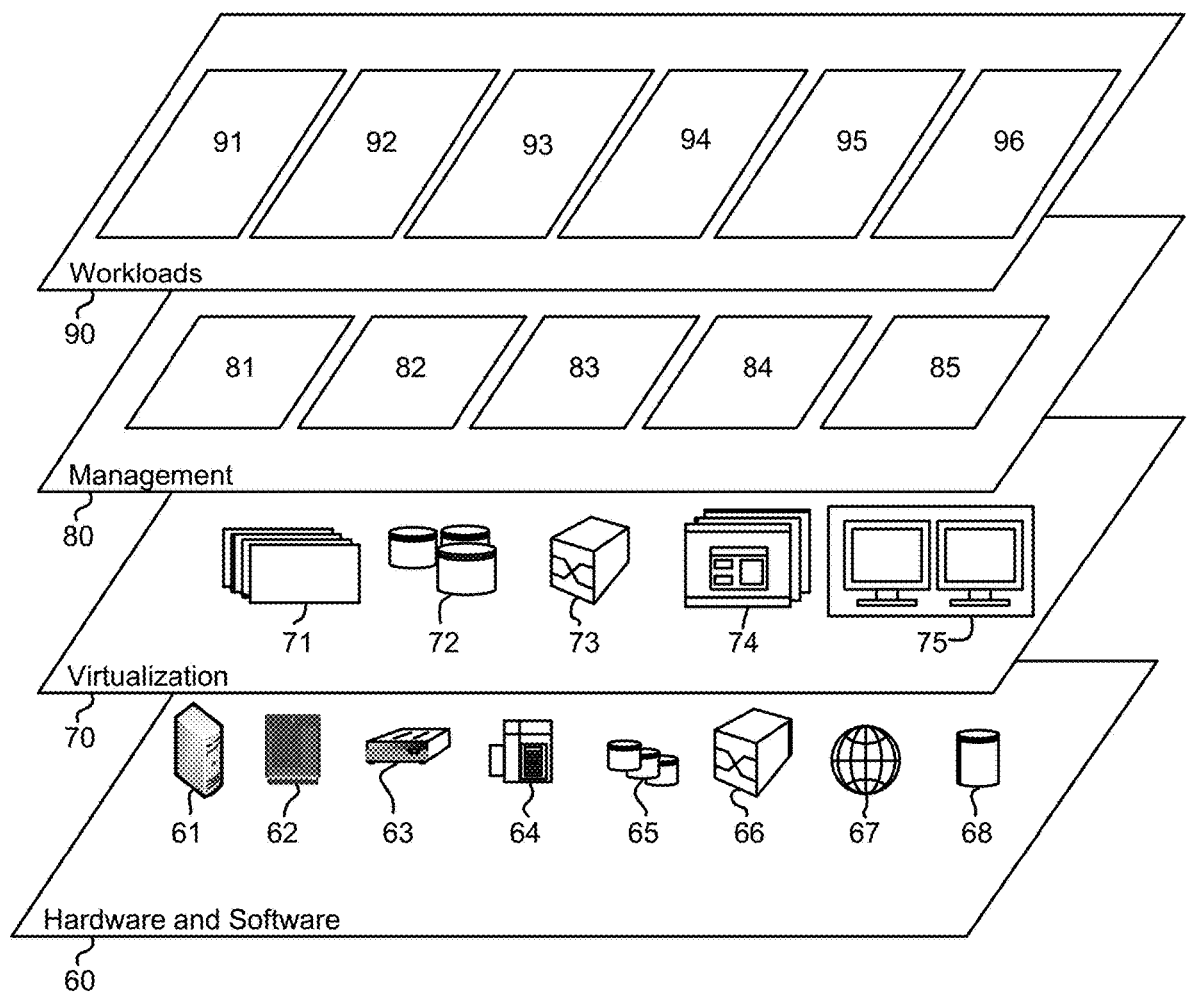
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload implementation 96.

Figure 3:
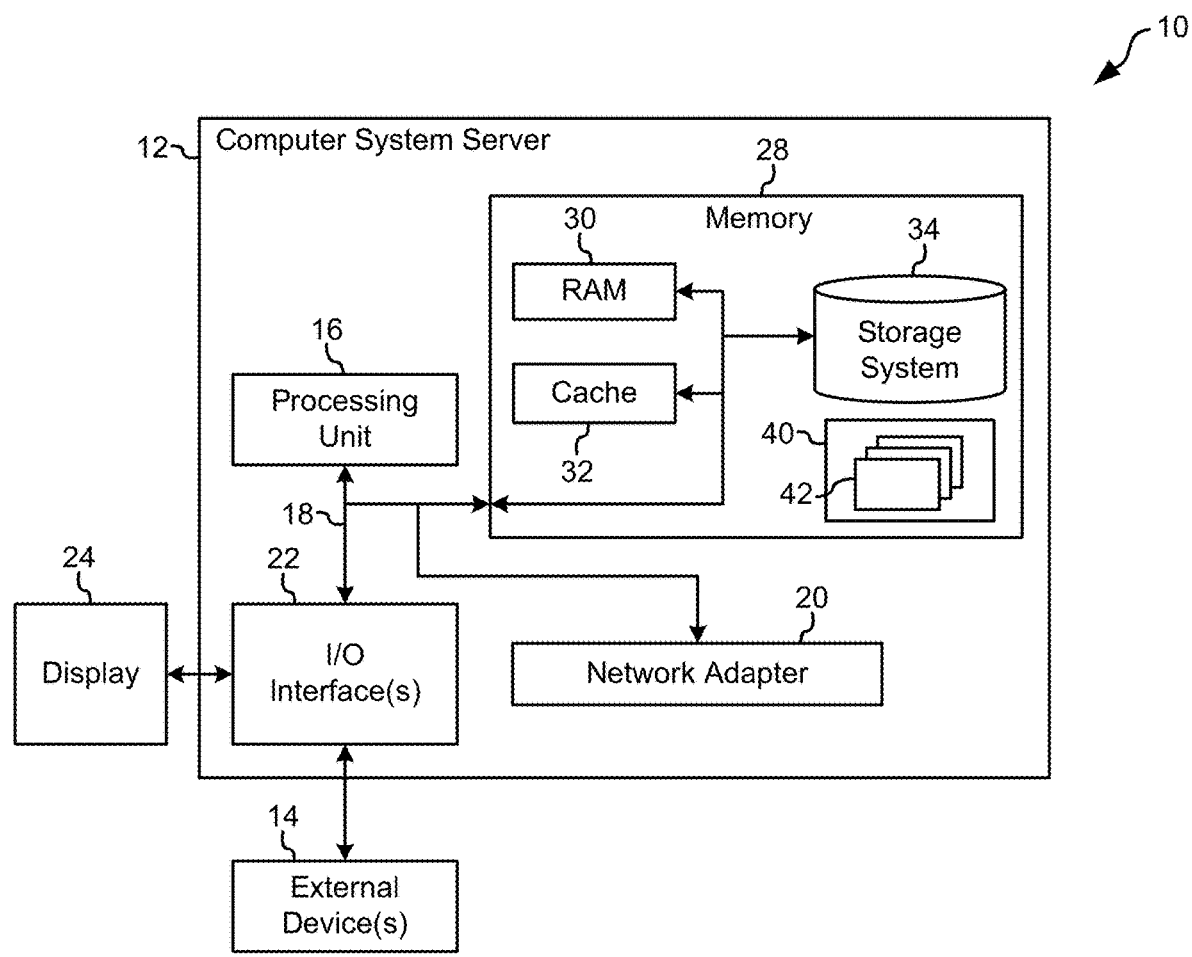
FIG. 3 depicts a cloud computing node in accordance with one aspect of the present invention.

Referring now to FIG. 3, a schematic of an example of a cloud computing node is shown. Cloud computing node 10 is only one example of a suitable cloud computing node and is not intended to suggest any limitation as to the scope of use or functionality of aspects of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of aspects of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of aspects of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
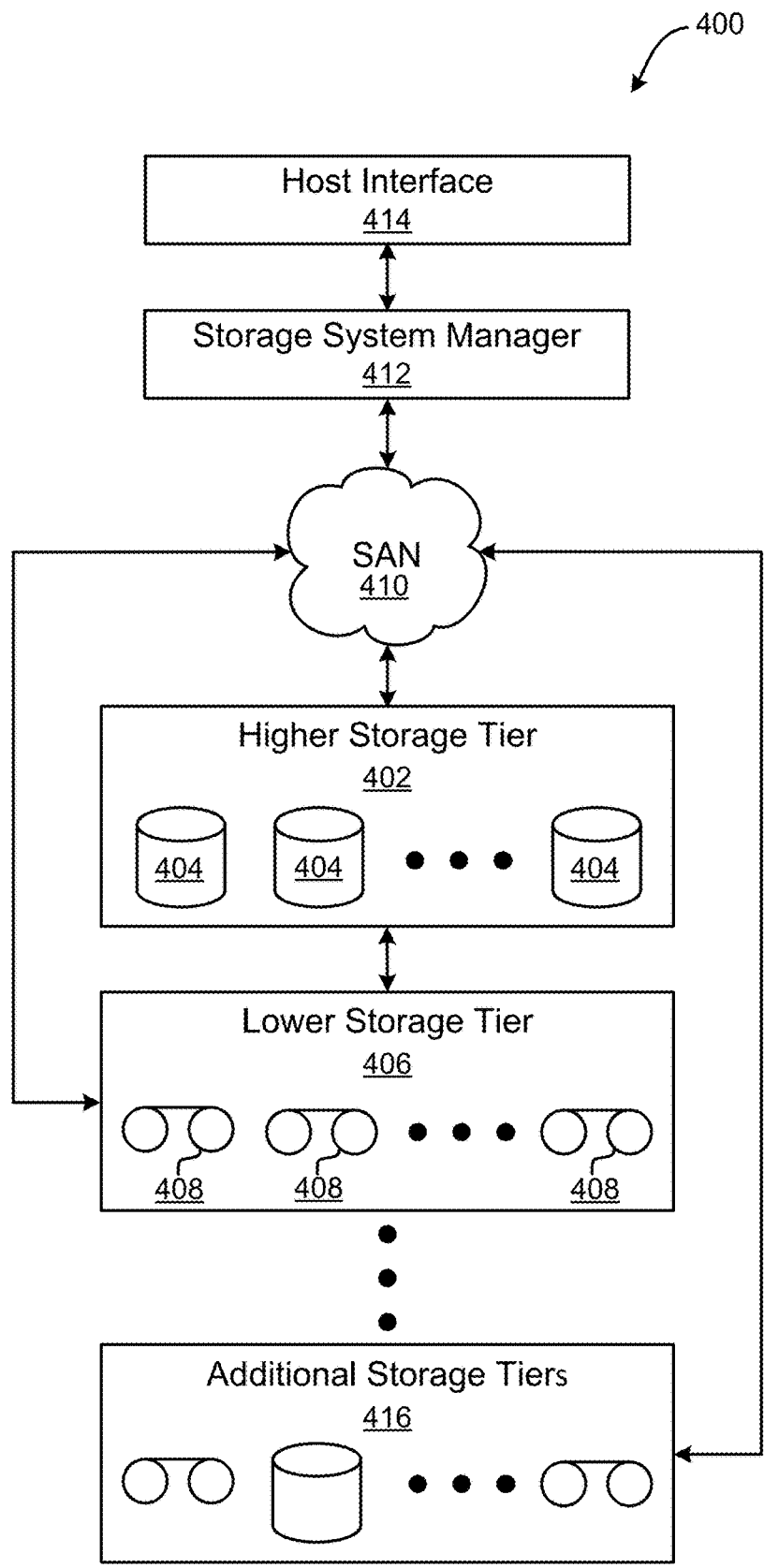
FIG. 4 illustrates a tiered data storage system in accordance with one aspect of the present invention.

Now referring to FIG. 4, a storage system 400 is shown according to one aspect. Note that some of the elements shown in FIG. 4 may be implemented as hardware and/or software, according to various aspects. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the aspects presented herein.

According to some aspects, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various aspects.

Figure 5:
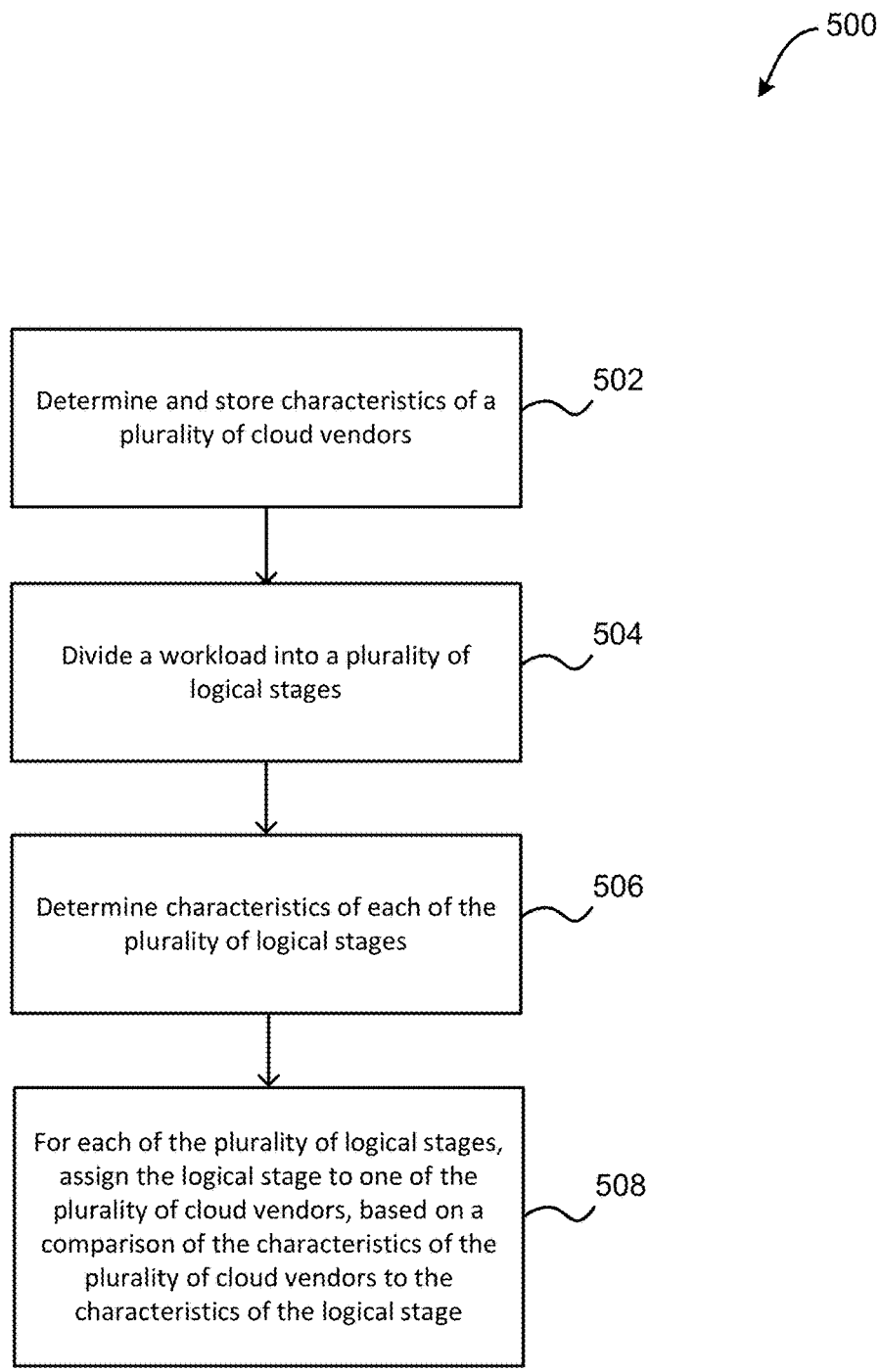
FIG. 5 illustrates a flowchart of a method for implementing workloads in a multi-cloud environment, in accordance with one aspect of the present invention.

Now referring to FIG. 5, a flowchart of a method 500 is shown according to one aspect. The method 500 may be performed in accordance with the present invention in any of the environments depicted in FIGS. 1-4, among others, in various aspects. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where characteristics of a plurality of cloud vendors are determined and stored. In one aspect, each of the plurality of cloud vendors may include a cloud-based service provider (e.g., a service provider located within a cloud computing environment, etc.). In another aspect, each of the plurality of cloud vendors may provide services such as computational processing, data storage, etc. For example, each of the cloud vendors may provide one or more services such as software as a service (SaaS), platform as a service (PaaS), infrastructure as a service (IaaS), etc.

Additionally, in one aspect, the characteristics of each of the plurality of cloud vendors may be determined by analyzing the cloud vendor. In another aspect, the analyzing may include running one or more capability and/or cost application programming interfaces (APIs) to perform a scan of the cloud vendor. In yet another aspect, the analyzing may include collecting and parsing one or more public and private security database information to identify one or more of reports, trends, vulnerabilities, security problems, etc. for each cloud vendor.

Further, in one aspect, the analyzing may include parsing one or more fix databases to determine any existing solutions to any existing security problems for one or more of the cloud vendors. In another aspect, the analyzing may include estimating one or more viability factors for each of the cloud vendors, based on collected review information for the cloud vendors. For example, the viability factors may include one or more of serviceability, a net promoter score (NPS), user reviews, performance benchmarks, tuning flexibility, etc.

Further still, in one aspect, for each cloud vendor, the characteristics may include capabilities of the cloud vendor, a cost of implementing the cloud vendor, a security level implemented by the cloud vendor, viability factors associated with the cloud vendor, etc. In another aspect, each of the characteristics may be compared to one or more predefined thresholds in order to determine a level for each of the characteristics.

For example, a security characteristic for a cloud vendor may be assigned a first level (e.g., a high level) if an amount of security implemented by a cloud vendor exceeds a first threshold. In another example, a security characteristic for a cloud vendor may be assigned a second level (e.g., a medium level) if an amount of security implemented by a cloud vendor is less than the first threshold but exceeds a second threshold. In yet another example, a security characteristic for a cloud vendor may be assigned a third level (e.g., a low level) if an amount of security implemented by a cloud vendor is less than the second threshold.

Also, in one aspect, the characteristics may include a cyber security characteristic for each cloud vendor that may indicate a level of security provided by the cloud vendor during workload implementation. In another aspect, the characteristics may include a cyber resiliency characteristic for each cloud vendor that may indicate a level of resiliency (e.g., crash protection, malware protection, redundant data protection, etc.) provided by the cloud vendor during workload implementation. For example, the cyber security and cyber resiliency characteristics for each cloud vendor may be derived from other characteristics identified for that cloud vendor.

In addition, in one aspect, an identifier of the cloud vendor may be stored in association with one or more of a textual description of the characteristics, a numeric valuation associated with each of the characteristics, etc. In another aspect, the characteristics may be stored on one or more storage devices, in a cloud storage environment, etc.

Furthermore, method 500 may proceed with operation 504, where a workload is divided into a plurality of logical stages. In one aspect, the workload may include required input (e.g., one or more instances of data to be analyzed and/or manipulated by the workload, etc.). In another aspect, the workload may include one or more computations to be performed as part of the workload (e.g., one or more computation algorithms to be performed on predetermined input, etc.). In yet another aspect, the workload may include one or more results output as a result of the performing the workload (e.g., output data, etc.).

Further still, in one aspect, the workload may include one or more generalized processing pipeline stages. In another aspect, the workload may be parsed to identify points of data input and output within the workload, as well as dependencies associated with the input. For example, for a given instance of data input within the workload, it may be determined whether the data input is reliant on data that is output from within the same workload.

Also, in one aspect, source code of the workload may be scanned to predict instances of data input and output within the workload. For example, this may be done to increase an accuracy of workload division/logical stage creation. In another aspect, the workload may then be divided into logical stages, where each of the logical stages includes data input that is not dependent on other logical stages within the workload.

Additionally, in one aspect, predetermined input (e.g., input identifying predetermined stages, etc.) may be referenced when dividing the workload into logical stages. In another aspect, each of the logical stages may be parsed to determine if one or more non-parallel tasks (e.g., tasks that cannot be performed in parallel due to one or more data or resource dependencies, etc.) are performed within a logical stage. For example, in response to determining that a logical stage contains non-parallel tasks, the logical stage may be divided into multiple smaller logical stages that each contain one of the non-parallel tasks.

Further, method 500 may proceed with operation 506, where characteristics of each of the plurality of logical stages are determined. In one aspect, a complexity of each of the logical stages may be determined based on inputs, outputs, and intermediate results within the stage. For example, the inputs, outputs, and intermediate results within the stage may be compared to historical workload stages to determine the complexity for the stage.

Further still, in one aspect, the characteristics of each of the logical stages may be determined based on the complexity for the stage. For example, the characteristics may include one or more of an estimated execution time, one or more desired performance characteristics, one or more security requirements, one or more resource requirements, one or more cyber resiliency requirements, etc.

Also, in one aspect, a first ranking of all logical stages may be determined for each of a plurality of resources. For example, the resources may include one or more of compute resources, storage resources, network resources, external resources, etc. In another example, for a compute resource, a first logical stage may require a lot of computations to be performed, while a second logical stage may require a lesser amount of computations to be performed. In yet another example, in response, the first logical stage may be ranked higher than the second logical stage for the compute resource.

In addition, in one aspect, a second ranking of all logical stages may be performed for cyber security and cyber resiliency factors, based on the first ranking. For example, this second ranking may determine a cyber security ranking for each logical stage that indicates a level of security needed by the logical stage during implementation. In another example, this second ranking may also determine a cyber resiliency ranking for each logical stage that indicates a level of resiliency (e.g., crash protection, malware protection, redundant data protection, etc.) needed by the logical stage during implementation.

Furthermore, method 500 may proceed with operation 508, where for each of the plurality of logical stages, the logical stage is assigned to one of the plurality of cloud vendors, based on a comparison of the characteristics of the plurality of cloud vendors to the characteristics of the logical stage. In one aspect, for each logical stage, the characteristics of the stage may be compared to the characteristics of each of the plurality of cloud vendors to determine one or more cloud vendors that are capable of meeting the requirements of the logical stage (e.g., processing requirements, storage requirements, bandwidth requirements, cyber security requirements, cyber resiliency requirements, etc.).

Further still, in one aspect, assigning the logical stage to a cloud vendor may include mapping/assigning the logical stage to the cloud vendor so that the cloud vendor receives the input required by the logical stage, performs the operations required by the logical stage, and outputs the data required by the logical stage. In another aspect, the assignments may be adjusted based on historical performance data. For example, if a predetermined cloud vendor provided performance above a predetermined threshold for an historical logical stage that has a predetermined level of similarity to a current logical stage, the predetermined cloud vendor may be assigned to the current logical stage.

Also, in one aspect, a mapping of each logical stage to the cloud vendors may be presented to one or more users (e.g., using a graphical user interface (GUI), etc.). For example, the user may confirm, adjust, and/or implement the logical stage using options provided within the GUI.

Additionally, in one aspect, resource allocation within each logical stage may be adjusted based on user/entity priorities. For example, statistical learning may be performed on historical tasks performed within historical workloads to determine one or more resources required by the historical tasks. These historical tasks may be compared to current tasks within a logical stage to determine resources needed for the task.

For example, a first task to be performed by a first entity within a logical stage may require use of a predetermined resource (e.g., high speed storage, etc.) within the assigned cloud vendor for that logical stage. In another example, a second task to be performed by a second entity within the logical stage may also require use of the predetermined resource within the assigned cloud vendor for that logical stage. In yet another example, in response to determining that the first entity has a higher priority than the second entity, the first entity may be allocated the predetermined resource, and the second entity may be assigned another resource (e.g., medium speed storage, etc.).

Further, in one aspect, data migration may be performed between the cloud vendors during an implementation of the workload to ensure data is located at the necessary cloud vendor during each task. For example, data initially produced at a high-security cloud vendor may be migrated to a low-security cloud vendor for later operations, but may be migrated back to the high-security cloud vendor after such operations are performed in order to securely store such data. This may implement life cycle management and ensure the security of predetermined data.

In this way, an implementation of each logical stage within the workload may be sent to an optimal cloud vendor for implementation. This may reduce an amount of resources (e.g., computing resources, storage resources, security resources, etc.) required to perform each logical stage, which may improve a performance of one or more computing systems implementing (e.g., executing, etc.) the workload. Additionally, a cyber resiliency of each logical stage may be ensured, which may reduce an amount of data/computational work that is lost to system outage or malware, which may also improve a performance of the computing systems implementing the workload.

Figure 6:
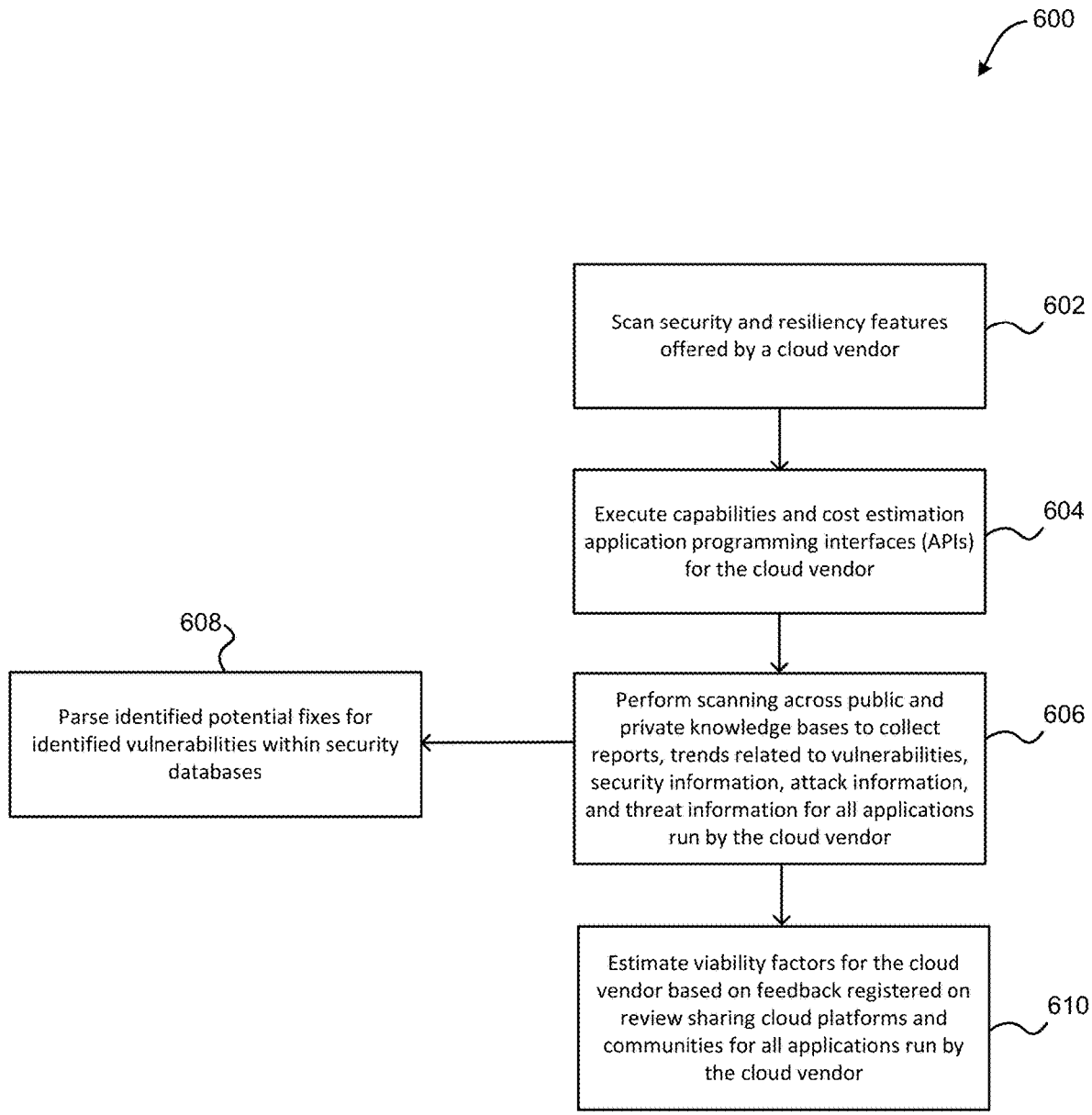
FIG. 6 illustrates a flowchart of a method for scanning a cloud vendor, in accordance with one aspect of the present invention.

Now referring to FIG. 6, a flowchart of a method 600 for scanning a cloud vendor is shown according to one aspect.

The method 600 may be performed in accordance with the present invention in any of the environments depicted in FIGS. 1-4, among others, in various aspects. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where security and resiliency features offered by a cloud vendor are scanned. Additionally, method 600 may proceed with operation 604, where capabilities and cost estimation application programming interfaces (APIs) are executed for the cloud vendor.

Additionally, method 600 may proceed with operation 606, where scanning is performed across public and private knowledge bases to collect reports, trends related to vulnerabilities, security information, attack information, and threat information for all applications run by the cloud vendor. Further, method 600 may proceed with operation 608, where identified potential fixes for identified vulnerabilities are parsed within security databases (e.g., NIST, etc.).

Further still, method 600 may proceed with operation 610, where viability factors are estimated for the cloud vendor based on feedback registered on review sharing cloud platforms and communities for all applications run by the cloud vendor.

In this way, characteristics of a cloud vendor may be identified.

Figure 7:
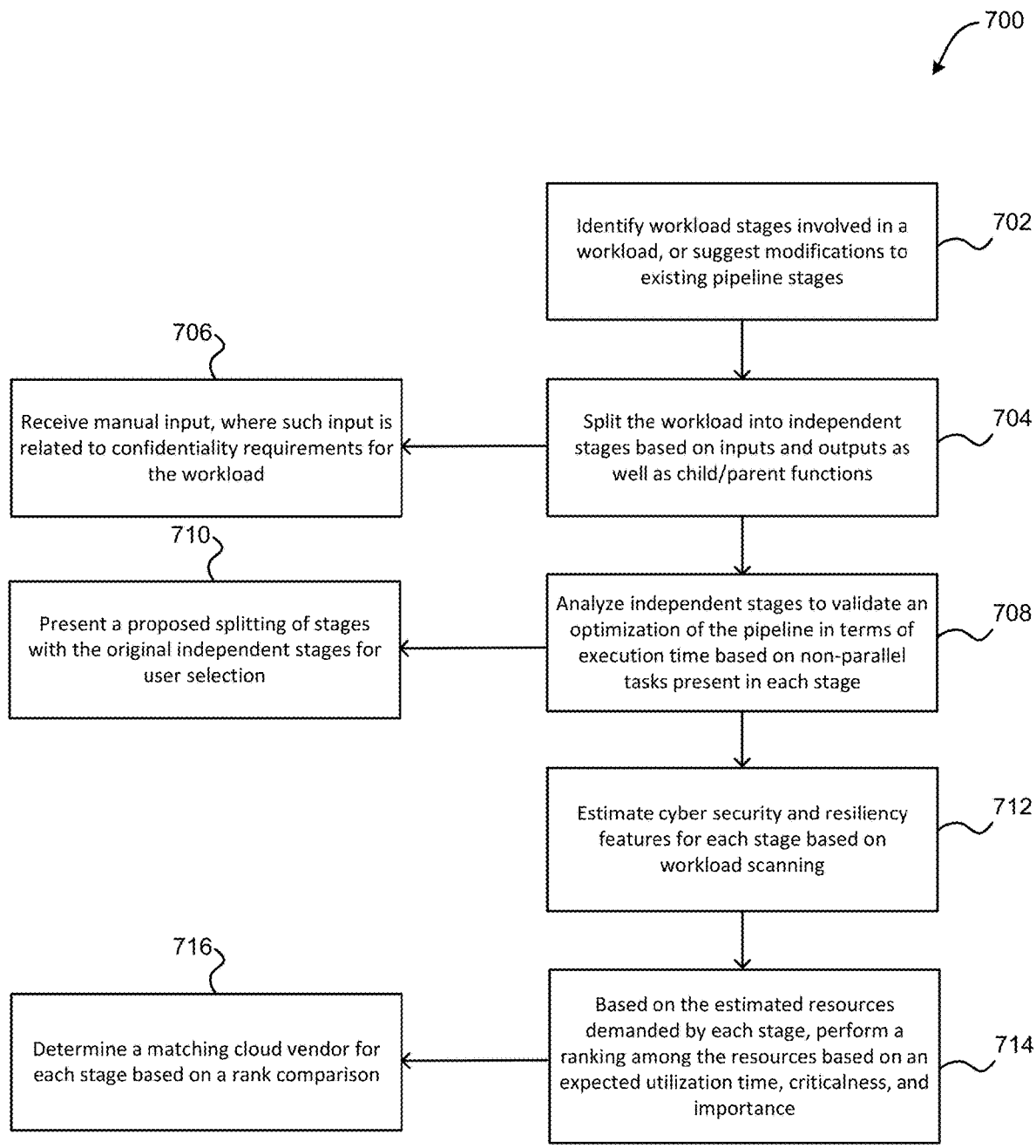
FIG. 7 illustrates a flowchart of a method for identifying workload requirements, in accordance with one aspect of the present invention.

Now referring to FIG. 7, a flowchart of a method 700 for identifying workload requirements is shown according to one aspect. The method 700 may be performed in accordance with the present invention in any of the environments depicted in FIGS. 1-4, among others, in various aspects. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where workload stages involved in a workload are identified, or modifications to existing pipeline stages are suggested. Additionally, method 700 may proceed with operation 704, where the workload is split into independent stages based on inputs and outputs as well as child/parent functions. Further, method 700 may proceed with operation 706, where manual input is received, where such input is related to confidentiality requirements for the workload.

Further still, method 700 may proceed with operation 708, where the independent stages are analyzed to validate an optimization of the pipeline in terms of execution time based on non-parallel tasks present in each stage. Also, method 700 may proceed with operation 710, where a proposed splitting of stages is presented with the original independent stages for user selection.

In addition, method 700 may proceed with operation 712, where cyber security and resiliency features are estimated for each stage based on workload scanning. Furthermore, method 700 may proceed with operation 714, where based on the estimated resources demanded by each stage, a ranking is performed among the resources based on an expected utilization time, criticalness, and importance. Further still, method 700 may proceed with operation 716, where a matching cloud vendor is determined for each stage based on a rank comparison.

In this way, cloud vendors may be matched to stages created for a workload.

Figure 8:
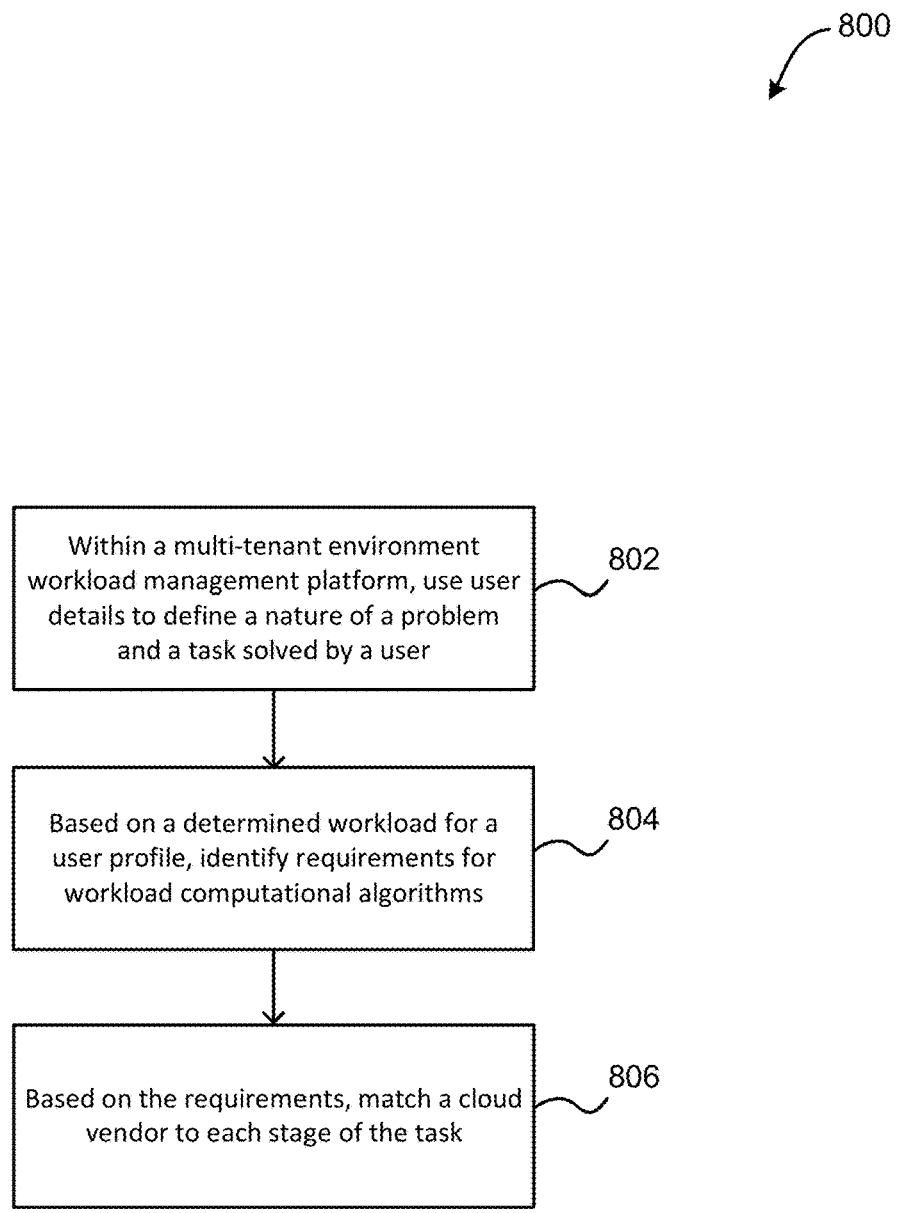
FIG. 8 illustrates a flowchart of a method for implementing a multi-tenant workload management engine, in accordance with one aspect of the present invention.

Now referring to FIG. 8, a flowchart of a method 800 for implementing a multi-tenant workload management engine is shown according to one aspect. The method 800 may be performed in accordance with the present invention in any of the environments depicted in FIGS. 1-4, among others, in various aspects. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various aspects, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where within a multi-tenant environment workload management platform, user details are used to define a nature of a problem and a task solved by a user. Additionally, method 800 may proceed with operation 804, where based on a determined workload for a user profile, requirements for workload computational algorithms are identified. Further, method 800 may proceed with operation 806, where based on the requirements, a cloud vendor is matched to each stage of the task.

Improving Multi-Cloud Orchestration, Workload Management Engine to Manage Resources Based on Cyber Resiliency Multi-Cloud/Hybrid Orchestration/Manager A multi-cloud orchestrator may include one or more applications that help manage the interconnections and interactions among multiple cloud resources as well as on-premises infrastructure. The orchestration layer may align business requests and workload with applications, data, and infrastructure. The orchestrator may help define policies and service levels through automated workloads, provisioning, and change management. The orchestrator may create an application-aligned infrastructure that can be scaled up or down based on the needs of each application. The orchestrator may also provide centralized management of the resource pool, including billing, metering, and chargeback for consumption.

Workload Management Engine

A workload management engine may distribute work across existing heterogeneous IT resources to create a shared, scalable, and fault-tolerant infrastructure that delivers faster, more reliable workload performance and reduces cost. The engine may balance load, allocate resources, and provide access to those resources. The engine may provide a resource management framework that takes job requirements, finds the best resources to run the job, and monitors job progress. Jobs may run according to host load and site policies.

Cyber Resiliency

Cyber resiliency may include an entity's ability to continuously deliver an intended outcome despite adverse cyber events. Entities with potential need of cyber resilience abilities include, but are not limited to, IT systems, critical infrastructure, business processes, organizations, societies and nation-states. Adverse cyber events are those that negatively impact the availability, integrity or confidentiality of networked IT systems and associated information and services. These events may be intentional (e.g., a cyber-attack) or unintentional (e.g., a failed software update), and may be caused by humans or nature or a combination thereof.

One objective of cyber resiliency is to maintain the entity's ability to deliver the intended outcome continuously, even when regular delivery mechanisms have failed (such as during a crisis or after a security breach). The concept also includes the ability to restore regular delivery mechanisms after such events, as well as the ability to continuously change or modify these delivery mechanisms if needed in the face of new risks. Performing data backups and disaster recovery operations are part of the process of restoring delivery mechanisms.

Composable Infrastructure

A composable infrastructure may include a framework whose physical compute, storage and network fabric resources are treated as services. In a composable infrastructure, resources are logically pooled so that administrators don't have to physically configure hardware to support a specific software application. Instead, the software's developer may define the application's requirements for physical infrastructure using policies and service profiles and then the software may use application programming interface (API) calls to create (compose) the infrastructure it needs to run on bare metal, as a virtual machine (VM), or as a container.

In one aspect, an orchestration and workload management engine may be integrated with traditional cloud orchestrator platforms. The engine may initiate while engaging resources required for provided workflow, and may identify the stages involved, analyze the stage characteristics, estimate the cyber resiliency features required per stage, compare the features with pre-collected cyber features offered by multiple clouds or on-premise decomposable infrastructure, determine matching cloud or on-premise infrastructure per stage (performing security and performance tuning if required) and perform resource life cycle management.

In one aspect, a multi-tenant aware orchestration and workload management engine may be integrated with traditional cloud orchestrator platforms. While spinning-up resources that are fed workflow input, the engine auto-identifies the stages involved (based on non-parallel task analysis and dependent stage analysis), analyzes the stage characteristics (based on the complexity of algorithm involved in the stage and expected time for completion), estimates the cyber security and resiliency features required per stage, compares them with pre-collected cyber features offered by multiple clouds or on-premise decomposable infrastructure, determines matching cloud or on-premise infrastructure per stage (and also performs security and performance tuning if required) and performs resource life cycle management (such as deployment, tuning, migration, storage, teardown, etc.).

One exemplary orchestration and workload management engine includes:

1. Scanning the security and resiliency features per service offered by preferred cloud vendors along with cost associations.
  A. A scan action is performed by executing capabilities APIs and cost estimation APIs per service offered by cloud vendors.
  B. A scan action is performed across public and private security databases (depending on the subscription levels of access) to collect and parse on latest reports, trends related to vulnerabilities, security, attacks, threats etc. per application offered per cloud vendor. The scheduler also identifies potential fixes by parsing databases such as NIST for the identified security problems.
  C. A scan operation is performed to estimate viability factors (such as serviceability, Net Promoter Score (NPS), user reviews, usability, performance benchmarks, optimized usage/tuning flexibility etc.) based on the feedback registered on review sharing cloud platforms, communities, developer mail threads, industry trend/research reports etc. per application offered per cloud vendor.

Scan results can be stored in a table such as the schema shown below in Table 1. This table may be extended to include capabilities such as network, VPN speeds and viability factors such as NPS, tuning etc.

TABLE 1

| CLOUD VENDOR | CAPABILITIES | COST | SECURITY | VIABILITY FACTORS |
|---|---|---|---|---|
| VENDOR 1 | Enhanced compute Magnetic, SSD, tape storage | Moderate | High | Low |
| VENDOR 2 | Moderate compute SSD, object storage | Low | Low | Moderate |

2. Auto-identifying stages involved in input workflow, or suggesting modifications to already input pipeline stages.
  A. Auto-identification involves an algorithm that parses the whole workload (input, computation algorithm(s) and expected output) and splits them to independent stages (the independent stages are whose inputs are readily available or has fewer child/functions). The auto-identification algorithm may include manual input related to an industry associated with the input workload, related to confidentiality, etc.
  B. The auto-identification also involves analysis of already input pipeline stages. It determines whether the pipeline is optimized in terms of execution time by analyzing non-parallel tasks present in each stage. Based on the analysis, it proposes a modified stage split-up to the administrator (where they are provided freedom to execute a workload by choosing an original or modified stage split-up).

3. Estimating the cyber security and resiliency features required per stage.
  A. A cyber security and resiliency feature scans and analyzes each stage's computation algorithms and their expected inputs, output, and intermediate results. The estimation is based on comparing each stage with past workload stages that are run using the workload management platform as well comparing each stage with predefined stage templates that are already input during deployment (input templates are based on software manufacturer experience gained through research study, beta programs and workload templates borrowed from other customers, etc.).
  B. Based on the complexity of computation algorithm, the approximate execution time is determined. Based on the estimated time, desired performance characteristics are determined that match the estimated computation time (e.g., where a cost per computation per stage is input by an administrator or is determined automatically) and security requirements and resources (e.g., network, external factors—WAN speed, compute, storage) demanded by the tasks involved in the stage.
  C. Based on the estimated resources demanded by each stage, a ranking is performed among the resources based on their expected utilization time, criticalness of resource and importance of input, and output generated by the stage. For example, as shown in Table 2 below, stage N is expected to generate a confidential output or produces an output after lot of computation where the inputs are generic or publicly known. Similarly, stage 1 is expected to generate a generic output with minimal computation and requires input data fed from an on-premise datastore.

TABLE 2

| STAGE | COMPUTE RANK | STORAGE RANK | NETWORK RANK | EXTERNAL FACTORS RANK |
|---|---|---|---|---|
| Stage 1 | Low | Low | Moderate | High |
| Stage 2 | High | Moderate | High | High |
| Stage N | Moderate | High | Low | Low |

Based on the above ranking, the proposed ranking algorithm ranks the stage against cyber security and resiliency, as shown below in Table 3.

TABLE 3

| STAGE | CYBER SECURITY RANK | RESILIENCY RANK |
|---|---|---|
| Stage 1 | High | Low |
| Stage 2 | Low | Moderate |
| Stage N | Moderate | High |

The workload management platform may compare the calculated ranking (in step 3 above) with the scan results (from step 1 above) which contain pre-collected cyber features, resiliency features offered by multiple clouds or on-premise decomposable infrastructure, etc. Based on the rank comparison, matching cloud or on-premise infrastructures may be matched to each stage.

Additionally, an orchestration schema may be presented to a user (e.g., an administrator) for approval. Upon approval, the proposed workload management platform requests the resources in each respective cloud, performs security and performance tuning (which may include application tuning to adapt to the difference in CPU speeds between on-premise clusters and clouds, as well as adjusting the difference in speeds between local networks and WAN connections), and performs resource life cycle management (such as secure deployment, tuning, migration, secure storage, tear down etc.).

Figure 9:
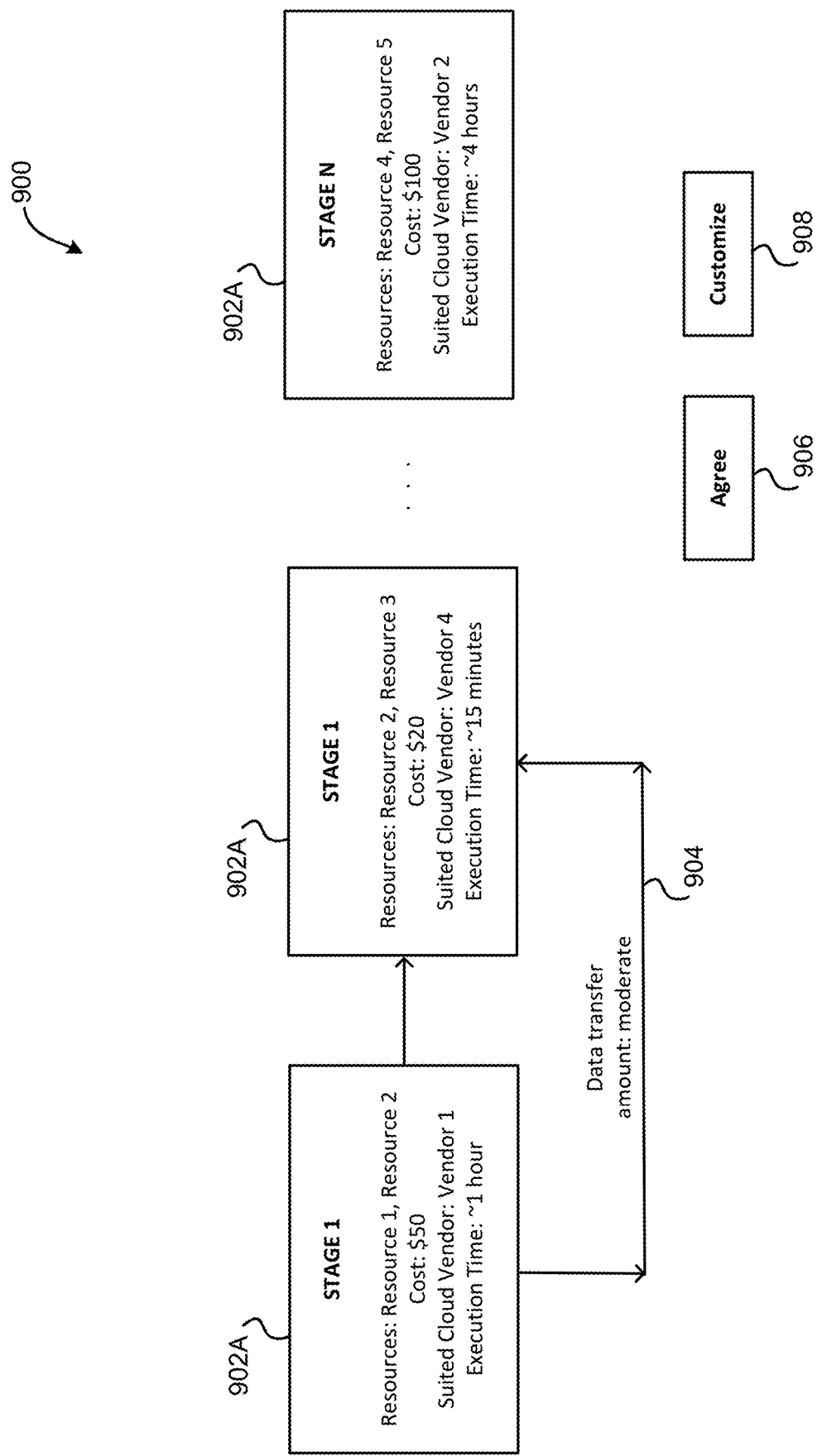
FIG. 9 illustrates an exemplary calculated orchestration schema, in accordance with one aspect of the present invention.

FIG. 9 illustrates an exemplary calculated orchestration schema 900 that is output to a display, according to one exemplary aspect. As shown, multiple stages 902A-C each include resource, cost, cloud vendor, and execution time determinations. Indications of data transfer volume 904A-B between staged 902A-C are also provided, as are options to accept 906 or customize 908 the calculated orchestration schema 900.

In one aspect, the workload management platform may also be multi-tenant aware. For example, the platform obtains user ID details along with rank or organization/department details, and based on these details the platform estimates the nature of a problem/task being performed by a user. For example, a nuclear research scientist may utilize the workload management platform. The algorithm may identify a corresponding user ID as "nuclear scientist" and may identify the workload as nuclear/atomic (which could be a workload corresponding to algorithms such as spectral analysis or Boltzmann distribution etc.).

Similarly, the same workload management platform is shared may be used by a biological university student. The proposed algorithm may identify the corresponding user ID as "biological student" and may identify the workload as computational biological (which could be a workload corresponding to algorithms such as sequencing or proton model building, etc.). In response, the nuclear scientist may be given compute, storage, and bandwidth priority over the biological student, as the former has priority over the latter.

The workload management platform access permissions may be raised such that the system may scan the source code of a compute software or algorithm for which the users are supposed to feed data, and based on the code scan of such compute software, the system may predict the nature of inputs/outputs and may likewise estimate the optimized target cloud resources and perform a comparison to calculate multi-cloud security scores. The workload management platform may also identify if in the past the current provided workload pattern has been already executed by any cloud vendor, and may analyze how well it behaved. Based on the results of the analysis, a ranking will be altered.

The workload management platform may also estimate a need of required data per stage/task and may perform life cycle management. For example, the workload management platform may initiate a workload stage execution using first cloud resources (based on a highest determined ranking). However, after completing the workload stage, the platform may identify that current stage inputs or outputs or intermediate results are needed in future stages which are planned to use lower ranking resources, but the first cloud resources offer a high ranking for long term storage as compared to the lower ranking resources. In this case, the workload management algorithm migrates the needed data to the lower ranking resources for a predetermined duration (where the duration time is dependent on a stage execution time), and after its completion, the data will be securely migrated back to the first cloud resources for long term storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:
1. A computer-implemented method, comprising:
   determining characteristics of a plurality of cloud vendors, including:
      running capability and cost application programming interfaces (APIs) to perform scans of the cloud vendors, and
      parsing one or more fix databases to determine existing solutions to existing security problems for the cloud vendor,
      wherein for at least some of the cloud vendors, the characteristics of the cloud vendors include capabilities of the cloud vendors, a cost of implementing the respective cloud vendor, and a security level implemented by the respective cloud vendor;
   storing the characteristics of the plurality of cloud vendors;
   dividing a workload into a plurality of logical stages according to points of data input and output within the workload, as well as dependencies associated with input to the workload;
   for each of the logical stages:
      determining a complexity of the logical stage by comparing inputs and outputs for the logical stage to historical stages, and
      determining characteristics of each of the logical stages based on the complexity of the logical stage by comparing inputs, outputs, and intermediate results within the logical stage to historical workload stages to determine the complexity of the respective logical stage, the characteristics including one or more performance characteristics and one or more security requirements;

for each of the logical stages, assigning the logical stage to one of the cloud vendors based on a comparison of the characteristics of the cloud vendors to the characteristics of the logical stage to determine the cloud vendor that is capable of meeting requirements of the logical stage, including comparing the characteristics of the logical stage to the characteristics of each of the cloud vendors to determine one or more of the cloud vendors that are capable of meeting the one or more performance characteristics and the one or more security requirements; and performing migration between the cloud vendors of data operated on during an implementation of the workload to ensure the data is located at necessary cloud vendors during the corresponding tasks of the workload.

2. The computer-implemented method of claim 1, comprising collecting, via the scans, security database information; and parsing the security database information to identify reports, trends, vulnerabilities, and security problems for the cloud vendors.

3. The computer-implemented method of claim 1, wherein at least some of the characteristics of the cloud vendors are determined by analyzing the cloud vendors, the analyzing including collecting and parsing one or more public and private security database information to identify one or more of reports, trends, vulnerabilities, and security problems for each of the cloud vendors.

4. The computer-implemented method of claim 1, wherein at least some of the characteristics of the cloud vendors are determined by analyzing the cloud vendors, the analyzing including parsing one or more fix databases to determine any existing solutions to any existing security problems for one or more of the cloud vendors.

5. The computer-implemented method of claim 1, wherein at least some of the characteristics of the cloud vendors are determined by estimating one or more viability factors for each of the respective cloud vendors, based on collected review information for the cloud vendors, where the viability factors include serviceability, a net promoter score (NPS), user reviews, performance benchmarks, and tuning flexibility.

6. The computer-implemented method of claim 1, wherein for at least some of the cloud vendors, the characteristics of a particular one of the cloud vendors include capabilities of the cloud vendor, a cost of implementing the cloud vendor, and viability factors associated with the cloud vendor.

7. The computer-implemented method of claim 1, wherein the characteristics of the cloud vendors are compared to one or more predefined thresholds in order to determine a level for each of the characteristics of the cloud vendors.

8. The computer-implemented method of claim 1, wherein for at least some of the cloud vendors, the characteristics for the cloud vendors include:
  a cyber security characteristic indicating a level of security provided by the cloud vendor during workload implementation, and
  a cyber resiliency characteristic indicating a level of crash protection, malware protection, and redundant data protection provided by the cloud vendor during workload implementation,
  an estimated execution time,
  one or more performance characteristics, and
  one or more resource requirements.

9. The computer-implemented method of claim 1, wherein dividing the workload includes parsing the workload to identify the points of data input and output within the workload.

10. The computer-implemented method of claim 1, wherein source code of the workload is scanned to predict instances of data input and output within the workload.

11. The computer-implemented method of claim 1, wherein at least some of the logical stages includes data input that is not dependent on other logical stages within the workload.

12. The computer-implemented method of claim 1, wherein the complexity of each of the logical stages is determined based on intermediate results within the logical stage.

13. The computer-implemented method of claim 1, wherein: at least some of the characteristics of the cloud vendors are determined by
  parsing one or more fix databases to determine existing solutions to existing security problems for one or more of the cloud vendors; and
  wherein dividing the workload includes parsing the workload to identify points of data input and output within the workload.

14. The computer-implemented method of claim 1, wherein assigning the logical stage to a cloud vendor includes mapping the logical stage to the cloud vendor so that the cloud vendor receives input required by the logical stage, performs operations required by the logical stage, and outputs data required by the logical stage.

15. The computer-implemented method of claim 1, further comprising presenting a mapping of each logical stage to the cloud vendors to one or more users, using a graphical user interface (GUI).

16. The computer-implemented method of claim 1, further comprising adjusting resource allocation within each logical stage based on user priorities.

17. The computer-implemented method of claim 1, wherein the migration includes migrating data from a first of the cloud vendors to a second of the cloud vendors, and migrating the data back from the second cloud vendor to the first cloud vendor.

18. A computer program product comprising one or more computer readable storage media, and program instructions collectively stored on the one or more computer readable storage media, the program instructions comprising instructions configured to cause one or more processors to perform a method comprising:
  analyzing, by the one or more processors, a plurality of cloud vendors, the analyzing including running capability and cost application programming interfaces (APIs) to perform a scan of each cloud vendor for determining characteristics of each of the cloud vendors, the analyzing including parsing one or more fix databases to determine existing solutions to existing security problems for the cloud vendor, wherein for at least some of the cloud vendors, the characteristics of the cloud vendors include capabilities of the cloud vendors, a cost of implementing the respective cloud vendor, and a security level implemented by the respective cloud vendor;
  determining, by the one or more processors, a relative level for each of the characteristics determined for the cloud vendors, the relative levels including relatively higher levels and relatively lower levels;

scanning, by the one or more processors, source code of a workload to predict instances of data input and output within the workload;

dividing, by the one or more processors, the workload into a plurality of logical stages, wherein dividing the workload includes parsing the workload to identify points of data input and output within the workload, as well as dependencies associated with input to the workload, wherein the dividing is based at least in part on the predicted instances of data input and output within the workload for increasing an accuracy of the dividing;

for each of the logical stages:
  determining, by the one or more processors, a complexity of the logical stage by comparing inputs and outputs for the logical stage to historical stages, and
  determining, by the one or more processors, characteristics of each of the logical stages based on the complexity of the logical stage by comparing inputs, outputs, and intermediate results within the logical stage to historical workload stages to determine the complexity of the respective logical stage, the characteristics including one or more performance characteristics and one or more security requirements;

comparing, by the one or more processors, the characteristics of the cloud vendors to the characteristics of the logical stages to determine which of the cloud vendors is capable of meeting requirements of the logical stage, the comparing including comparing the characteristics of the logical stage to the characteristics of each of the cloud vendors to determine one or more of the cloud vendors that are capable of meeting the one or more performance characteristics and the one or more security requirements;

assigning, by the one or more processors based on the comparing, the logical stages to different ones of the cloud vendors for execution of the logical stages by the cloud vendors; and performing migration between the cloud vendors of data operated on during an implementation of the workload to ensure the data is located at necessary cloud vendors during the corresponding tasks of the workload.

19. The computer program product of claim 18, wherein the cloud vendors execute the logical stage(s) assigned thereto.

20. The computer program product of claim 18, wherein the characteristics of at least some of the cloud vendors are determined by analyzing the respective cloud vendor, the analyzing including collecting and parsing one or more public and private security database information to identify one or more of reports, trends, vulnerabilities, and security problems for each of the cloud vendors.

21. The computer program product of claim 18, comprising program instructions configured to cause the one or more processors to implement a life cycle management, including performing migration between the cloud vendors of data operated on during an implementation of the workload to ensure the data is located at necessary cloud vendors for operation thereupon during a corresponding task of the workload.

22. A system, comprising:
a processor; and
logic integrated with the processor, executable by the processor, or integrated with and executable by the processor, the logic being configured to:

running application programming interfaces (APIs) to scan a plurality of cloud vendors to determine characteristics of the plurality of cloud vendors;

parsing one or more fix databases to determine existing solutions to existing security problems for the cloud vendor to determine characteristics of the plurality of cloud vendors, wherein for at least some of the cloud vendors, the characteristics of the cloud vendors include capabilities of the cloud vendors, a cost of implementing the respective cloud vendor, and a security level implemented by the respective cloud vendor;

store the characteristics of the plurality of cloud vendors;

scan source code of a workload to predict instances of data input and output within the workload;

divide the workload into a plurality of logical stages according to the predicted instances of data input and output within the workload, as well as dependencies associated with input to the workload;

for each of the logical stages:
  determine a complexity of the logical stage by comparing inputs and outputs for the logical stage to historical stages, and
  determine characteristics of each of the logical stages based on the complexity of the logical stage by comparing inputs, outputs, and intermediate results within the logical stage to historical workload stages to determine the complexity of the respective logical stage, the characteristics including one or more performance characteristics and one or more security requirements;

for each of the logical stages, assign the logical stage to one of the cloud vendors, based on a comparison of the characteristics of the cloud vendors to the characteristics of the logical stage to determine the cloud vendor that is capable of meeting requirements of the logical stage, wherein comparing the characteristics of the logical stage to the characteristics of the cloud vendors includes determining that one or more of the cloud vendors is capable of meeting one or more performance characteristics, the one or more security requirements, one or more resource requirements, and one or more cyber resiliency requirements of the logical stage; and perform migration between the cloud vendors of data operated on during an implementation of the workload to ensure the data is located at necessary cloud vendors for operation thereupon during the corresponding tasks of the workload.

23. A computer-implemented method, comprising:
determining characteristics of a plurality of cloud vendors, including, for each of the cloud vendors:
  running an application programming interface (API) to perform a scan of the cloud vendor, collecting and parsing security database information to identify reports, trends, vulnerabilities, and security problems for the cloud vendor,
  parsing one or more fix databases to determine existing solutions to existing security problems for the cloud vendor, and
  estimating viability factors for the cloud vendor, the viability factors including a serviceability, a net promoter score (NPS), performance benchmarks, and tuning flexibility for the cloud vendor,
  wherein the characteristics include capabilities of the cloud vendor, a cost of implementing the cloud vendor, a security level implemented by the cloud vendor, and viability factors associated with the cloud vendor;

scanning source code of a workload to predict instances of data input and output within the workload;

dividing the workload into a plurality of logical stages;

determining characteristics of each of the logical stages, including, for each of the logical stages:

comparing inputs, outputs, and intermediate results within the logical stage to historical workload stages to determine a complexity for the logical stage, wherein the characteristics of the logical stage are determined based on the complexity for the logical stage, wherein the characteristics of the logical stage include an estimated execution time, one or more performance characteristics, one or more security requirements, one or more resource requirements, and one or more cyber resiliency requirements; and for each of the logical stages, assigning the logical stage to one of the cloud vendors, based on a comparison of the characteristics of the cloud vendors to the characteristics of the logical stage, including:

comparing the characteristics of the logical stage to the characteristics of each of the cloud vendors to determine one or more cloud vendors that are capable of meeting the one or more performance characteristics, the one or more security requirements, the one or more resource requirements, and the one or more cyber resiliency requirements of the logical stage; and performing data migration between the cloud vendors during an implementation of the workload to ensure data is located at necessary cloud vendors during the corresponding tasks of the workload.

24. A computer program product comprising one or more computer readable storage media, and program instructions collectively stored on the one or more computer readable storage media, the program instructions comprising instructions configured to cause one or more processors to perform a method comprising:

determining, by the one or more processors, characteristics of a plurality of cloud vendors, including, for each of the cloud vendors:

running capability and cost application programming interfaces (APIs) to perform a scan of the cloud vendor, and parsing one or more fix databases to determine existing solutions to existing security problems for the cloud vendor, wherein the characteristics include capabilities of the cloud vendor, a cost of implementing the cloud vendor, and a security level implemented by the cloud vendor;

scanning, by the one or more processors, source code of a workload to predict instances of data input and output within the workload;

dividing, by the one or more processors, the workload into a plurality of logical stages, including parsing the workload to identify points of data input and output within the workload, as well as dependencies associated with input to the workload;

determining, by the one or more processors, characteristics of each of the logical stages, including, for each of the logical stages:

comparing inputs, outputs, and intermediate results within the logical stage to historical workload stages to determine a complexity for the logical stage, wherein the characteristics of the logical stage are determined based on the complexity for the logical stage, wherein the characteristics of the logical stage include an estimated execution time, one or more performance characteristics, one or more security requirements, one or more resource requirements, and one or more cyber resiliency requirements; and for each of the logical stages, assigning, by the one or more processors, the logical stage to one of the cloud vendors, based on a comparison of the characteristics of the cloud vendors to the characteristics of the logical stage, including:

comparing the characteristics of the logical stage to the characteristics of each of the cloud vendors to determine one or more cloud vendors that are capable of meeting the one or more performance characteristics, one or more security requirements, one or more resource requirements, and one or more cyber resiliency requirements of the logical stage; and implementing a life cycle management, including performing data migration between the cloud vendors during an implementation of the workload to ensure data is located at necessary cloud vendors during the corresponding tasks of the workload.

\* \* \* \* \*